(12) United States Patent
Wan et al.

(10) Patent No.: US 8,982,808 B2
(45) Date of Patent: Mar. 17, 2015

(54) METHOD FOR TRANSMITTING A SIGNAL AND COMMUNICATIONS APPARATUS

(75) Inventors: Lei Wan, Beijing (CN); Xiaotao Ren, Beijing (CN); Yongxia Lv, Beijing (CN); Yunzhe Hou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 746 days.

(21) Appl. No.: 13/235,148

(22) Filed: Sep. 16, 2011

(65) Prior Publication Data

US 2012/0002660 A1 Jan. 5, 2012

Related U.S. Application Data

(63) Continuation of application No. PCT/CN2009/070810, filed on Mar. 16, 2009.

(51) Int. Cl.
| | |
|---|---|
| H04W 4/00 | (2009.01) |
| H04L 5/00 | (2006.01) |
| H04B 7/02 | (2006.01) |
| H04B 7/06 | (2006.01) |

(52) U.S. Cl.
CPC ............ *H04L 5/0035* (2013.01); *H04L 5/0048* (2013.01); *H04L 5/0091* (2013.01); *H04B 7/024* (2013.01); *H04B 7/0626* (2013.01)
USPC .......................................... 370/329; 370/337

(58) Field of Classification Search
None
See application file for complete search history.

(56) References Cited

U.S. PATENT DOCUMENTS

| | | | | |
|---|---|---|---|---|
| 7,818,013 B2* | 10/2010 | Li et al. | ........................ | 455/452.2 |
| 8,000,407 B2* | 8/2011 | Prakash | ........................ | 375/295 |
| 8,271,043 B2* | 9/2012 | Kim et al. | ................... | 455/562.1 |
| 8,290,539 B2* | 10/2012 | Li et al. | ........................ | 455/562.1 |
| 8,401,480 B2* | 3/2013 | Koo et al. | ..................... | 455/63.1 |
| 8,428,018 B2* | 4/2013 | Noh et al. | ...................... | 370/329 |

(Continued)

FOREIGN PATENT DOCUMENTS

| | | |
|---|---|---|
| CN | 101197655 | 6/2008 |
| CN | 101321368 | 12/2008 |
| CN | 101383654 | 3/2009 |

OTHER PUBLICATIONS

Written Opinion of the International Searching Authority, mailed Dec. 3, 2009, in corresponding International Application No. PCT/CN2009/070810 (4 pp.).

(Continued)

*Primary Examiner* — Michael J Moore, Jr.

(74) *Attorney, Agent, or Firm* — Staas & Halsey LLP (57) ABSTRACT

A method for transmitting a signal and a communications apparatus are provided. The method includes: obtaining a signal transmission mode, where the signal transmission mode indicates that an uplink signal is transmitted in a multiplexing mode; and transmitting the uplink signal on an uplink band and a downlink band in the multiplexing mode according to the obtained signal transmission mode. The communications apparatus includes: a first obtaining unit, configured to obtain a signal transmission mode, where the signal transmission mode indicates that an uplink signals is transmitted in a multiplexing mode; and a transmitting unit, configured to transmit the uplink signal on an uplink band and a downlink band in the multiplexing mode according to the obtained signal transmission mode. The technical solutions of embodiments of the present invention can reduce signaling overheads of the system and improve spectrum efficiency of the system when obtaining channel state information (CSI).

8 Claims, 3 Drawing Sheets

---

Obtain a signal transmission mode, where the signal transmission mode indicates that an uplink signal is transmitted in a multiplexing mode — 101

Transmit the uplink signal on an uplink band and a downlink band in the multiplexing mode according to the obtained signal transmission mode — 102

(56) References Cited

U.S. PATENT DOCUMENTS

| | | | |
|---|---|---|---|
| 8,599,712 B2 * | 12/2013 | Sampath | 370/252 |
| 2003/0224814 A1 | 12/2003 | Qu et al. | |
| 2007/0254598 A1 * | 11/2007 | Bachl et al. | 455/73 |
| 2008/0049668 A1 * | 2/2008 | Kakura et al. | 370/329 |
| 2008/0132281 A1 * | 6/2008 | Kim et al. | 455/562.1 |
| 2010/0177675 A1 | 7/2010 | Ai | |
| 2010/0227565 A1 * | 9/2010 | Sun et al. | 455/67.11 |
| 2011/0235620 A1 * | 9/2011 | Ahn et al. | 370/336 |
| 2011/0317614 A1 * | 12/2011 | Park et al. | 370/315 |

OTHER PUBLICATIONS

International Search Report, mailed Dec. 3, 2009, in International Application No. PCT/CN2009/070810 (4 pp.).

Chinese Office Action mailed Apr. 3, 2013 in corresponding Chinese Patent Application No. 200980119213.3.

* cited by examiner

FIG. 7

METHOD FOR TRANSMITTING A SIGNAL AND COMMUNICATIONS APPARATUS

CROSS-REFERENCE TO RELATED APPLICATIONS

This application is a continuation of International Application No. PCT/CN2009/070810, filed on Mar. 16, 2009, which is hereby incorporated by reference in its entirety.

FIELD OF THE INVENTION

The present invention relates to the field of communications technologies, and in particular, to a method for transmitting a signal and a communications apparatus.

BACKGROUND OF THE INVENTION

A coordinated multi-point (CoMP) transmission technology is an important technology in a fourth generation mobile communications system, and plays an important role in greatly improving spectrum efficiency. The CoMP transmission technology simultaneously provides a data transmission service for one or multiple user equipments (UEs) at multiple access points that are geographically separate from each other, where the multiple access points may belong to one or different NodeBs.

For the CoMP transmission technology, before performing CoMP transmission or reception, a NodeB needs to select an access point (set) for a UE and schedule time/frequency resources used for transmission. These operations need to refer to channel state information (CSI) between the UE and the access point (set). The CSI includes a channel quality indicator (CQI), a rank indicator (RI), and a precoding matrix indicator (PMI). In a single-point transmission system of the prior art, the UE transmits an uplink reference signal to the NodeB through an uplink band, and therefore, the NodeB may obtain the CSI of an uplink channel according to the received uplink reference signal; for downlink CSI, the NodeB transmits a downlink reference signal, and after receiving the downlink reference signal of the NodeB, the UE may obtain the downlink CSI, and feed back the obtained downlink CSI to the NodeB through the uplink band.

If the method in the single-point transmission system of the prior art is also used in a CoMP transmission system, huge signaling overheads are caused. Because in the CoMP transmission system, multiple NodeBs transmit downlink reference signals, and after obtaining the downlink CSI according to a received downlink reference signal of each NodeB, the UE feeds back the obtained downlink CSI to each NodeB through the uplink band, the signaling overheads of the uplink feedback CSI are huge, resulting in huge signaling overheads of the whole system and affecting the spectrum efficiency of the whole system.

SUMMARY OF THE INVENTION

A technical problem to be solved in embodiments of the present invention is to provide a method for transmitting a signal and a communications apparatus to reduce signaling overheads of a system and improve spectrum efficiency of the system when obtaining CSI.

To solve the preceding technical problem, embodiments of the present invention are implemented through the following technical solutions:

A method for transmitting a signal includes: obtaining a signal transmission mode, where the signal transmission mode indicates that an uplink signal is transmitted in a multiplexing mode; and transmitting the uplink signal on an uplink band and a downlink band in the multiplexing mode according to the obtained signal transmission mode.

A communications apparatus includes: a first obtaining unit, configured to obtain a signal transmission mode, where the signal transmission mode indicates that an uplink signal is transmitted in a multiplexing mode; and a transmitting unit, configured to transmit the uplink signal on an uplink band and a downlink band in the multiplexing mode according to the obtained signal transmission mode.

A communications apparatus includes: a first setting unit, configured to set a signal transmission mode of a UE, where the signal transmission mode indicates that an uplink signal is transmitted in a multiplexing mode; and a sending unit, configured to send the signal transmission mode to the UE and instruct the UE to transmit the uplink signal on an uplink band and a downlink band in the multiplexing mode according to the signal transmission mode.

As seen from the preceding technical solutions, a technical solution of the embodiments of the present invention is as follows: The UE transmits the uplink signal on the uplink band and the downlink band in the multiplexing mode according to the obtained signal transmission mode, which uses both the uplink band and the downlink band, that is, the NodeB does not need to transmit a downlink signal to perform downlink channel measurement but receives the uplink signal transmitted by the UE on the downlink band to perform downlink channel measurement, so that the NodeB can obtain downlink CSI. Therefore, signaling overheads of the system caused by uplink feedback are reduced effectively and the spectrum efficiency of the system is improved.

BRIEF DESCRIPTION OF THE DRAWINGS

To more clearly describe the technical solutions in the embodiments of the present invention or in the prior art, the following briefly describes the accompanying drawings required in the description of the embodiments of the present invention or the prior art. Apparently, the accompanying drawings illustrate only some embodiments of the present invention, and a person skilled in the art can derive other drawings from the accompanying drawings without creative efforts.

DETAILED DESCRIPTION OF THE EMBODIMENTS

Technical solutions in the embodiments of the present invention are described clearly and completely with reference to the accompanying drawings. Apparently, the embodiments are only exemplary embodiments of the present invention and the present invention is not limited to such embodiments. Other embodiments that those skilled in the art derive from the embodiments of the present invention also fall within the protection scope of the present invention.

Embodiments of the present invention provide a method for transmitting a signal to reduce signaling overheads of a system and improve spectrum efficiency of the system when obtaining CSI.

Embodiments of the present invention are specific to a method for transmitting an uplink signal by a UE in a CoMP transmission system.

Figure 1:
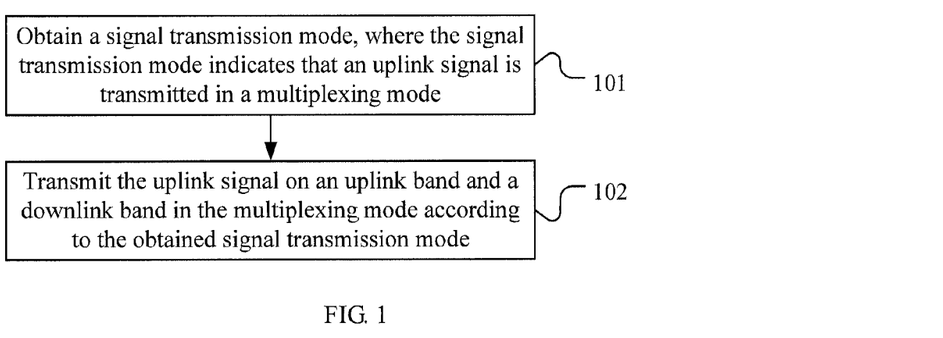
FIG. 1 is a flowchart of a method for transmitting a signal according to a first embodiment of the present invention.

FIG. 1 is a flowchart of a method for transmitting a signal according to a first embodiment of the present invention. The method includes:

Step 101: Obtain a signal transmission mode, where the signal transmission mode indicates that an uplink signal is transmitted in a multiplexing mode.

A UE obtains the signal transmission mode that is sent by a network device such as a NodeB. The signal transmission mode may be obtained in the following way: The NodeB actively sends the signal transmission mode to the UE; or the NodeB sends the signal transmission mode to the UE after the UE sends a request to the NodeB; or the NodeB and the UE agree on the signal transmission mode beforehand without a need of a signaling notification.

The uplink signal may be an uplink reference signal, a transmission mode of the uplink reference signal that is included in the obtained signal transmission mode is a multiplexing mode, and the multiplexing mode may be a TDM mode, a frequency division multiplexing (FDM) mode, or other multiplexing modes.

Step 102: Transmit the uplink signal on an uplink band and a downlink band in the multiplexing mode according to the obtained signal transmission mode.

When the uplink signal is the uplink reference signal, after obtaining the signal transmission mode, the UE transmits the uplink reference signal on the uplink band and the downlink band in the multiplexing mode.

If the multiplexing mode is TDM, the uplink reference signal is transmitted on the uplink band and the downlink band in the TDM mode. Specifically, the uplink reference signal is alternately transmitted on the uplink band and the downlink band in a unit of subframe, where an alternation mode includes a periodic alternation mode and a non-periodic alternation mode.

As seen from the first embodiment, a technical solution of this embodiment of the present invention is as follows: The UE transmits the uplink signal on the uplink band and the downlink band in the multiplexing mode according to the obtained signal transmission mode, which uses both the uplink band and the downlink band, that is, the NodeB does not need to transmit a downlink signal to perform downlink channel measurement but receives the uplink signal transmitted by the UE on the downlink band to perform downlink channel measurement, so that the NodeB can obtain downlink CSI. Therefore, signaling overheads of the system caused by uplink feedback are reduced effectively and the spectrum efficiency of the system is improved.

Embodiments of the present invention are further detailed below.

The following takes that a UE transmits an uplink reference signal on an uplink band and a downlink band in a TDM mode in an Orthogonal Frequency Division Multiplexity (OFDM) system as an example for description. However, the present invention is not limited thereto.

Figure 2:
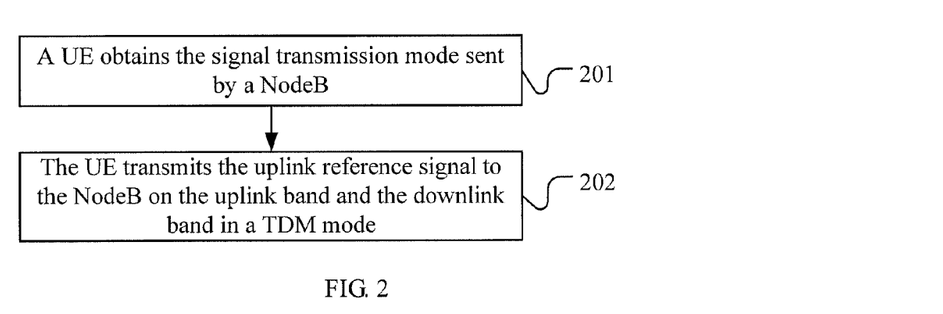
FIG. 2 is a flowchart of a method for transmitting a signal according to a second embodiment of the present invention.

FIG. 2 is a flowchart of a method for transmitting a signal according to a second embodiment of the present invention. The method includes:

Step 201: A UE obtains a signal transmission mode that is sent by a NodeB.

In this embodiment of the present invention, the NodeB needs to set the signal transmission mode of the UE beforehand.

The signal transmission mode set by the NodeB is that the UE simultaneously uses an uplink band and a downlink band to transmit an uplink reference signal. Therefore, the transmission mode of the uplink reference signal is set to a multiplexing mode. The multiplexing mode may be a TDM mode, or other multiplexing modes such as an FDM mode, a code division multiplexing mode, or a space division multiplexing mode. This embodiment takes the TDM mode as an example for description.

The uplink reference signal transmitted through the downlink band may be used for measuring a downlink channel, and the uplink reference signal transmitted through the uplink band may be used for measuring an uplink channel. The NodeB sets the UE to send the uplink reference signal through the downlink band. In this way, the NodeB may obtain CSI of the downlink channel according to the received uplink reference signal on the downlink band, which is different from the prior art in which the NodeB can obtain the CSI of the downlink channel only through feedback of the UE.

The signal transmission mode set by the NodeB may be that the uplink reference signal is alternately transmitted on the uplink band and the downlink band in a unit of subframe, where an alternation mode includes a periodic alternation mode and a non-periodic alternation mode.

After setting the signal transmission mode of the UE, the NodeB actively sends the signal transmission mode to the UE through downlink control signaling; or the NodeB sends the signal transmission mode to the UE after receiving a request of the UE, so that the UE obtains the signal transmission mode that is set and sent by the NodeB; or the NodeB and the UE agree on the signal transmission mode beforehand without a need of a signaling notification.

Step 202: The UE transmits the uplink reference signal to the NodeB on the uplink band and the downlink band in the TDM mode.

The UE transmits the uplink reference signal according to the signal transmission mode after obtaining the signal transmission mode that is sent by the NodeB.

The UE transmits the uplink reference signal on the downlink band and the uplink band on a time division basis according to the TDM mode. The uplink reference signal is transmitted in a unit of subframe.

According to the signal transmission mode, the UE alternately transmits the uplink reference signal on the uplink band and the downlink band in a unit of subframe, where the alternation mode includes the periodic alternation mode and the non-periodic alternation mode.

The periodic alternation mode, for example, may be as follows: In a first subframe, the uplink reference signal is transmitted on the uplink band; in a second subframe, the uplink reference signal is transmitted on the downlink band; in a third subframe, the uplink reference signal is transmitted on the uplink band; in a fourth subframe, the uplink reference signal is transmitted on the downlink band, and so on.

Figure 3:
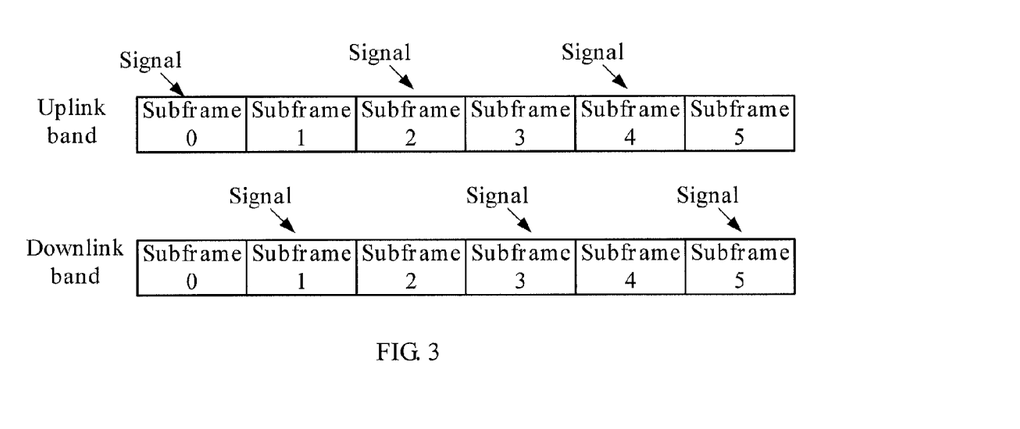
FIG. 3 is a schematic diagram illustrating transmission of an uplink reference signal in a time division multiplexing (TDM) mode according to the second embodiment of the present invention.

FIG. 3 is a schematic diagram illustrating transmission of the uplink reference signal in a TDM mode according to the second embodiment of the present invention. Specifically, in subframe 0, the uplink reference signal is transmitted on the uplink band. In subframe 1, the uplink reference signal is transmitted on the downlink band, and so on. Subsequently, in subframes 2 and 4, the uplink reference signal is transmitted on the uplink band; and in subframes 3 and 5, the uplink reference signal is transmitted on the downlink band.

It should be noted that FIG. 3 is only an example. A specific TDM mode may be varied. For example, the periodic alternation mode may also be as follows: In several consecutive subframes, the uplink reference signal is transmitted on the uplink band; and in several consecutive subframes, the uplink reference signal is transmitted on the downlink band. For example, in subframes 0-2, the uplink reference signal is transmitted on the uplink band; in subframes 3-5, the uplink reference signal is transmitted on the downlink band, and so on. The periodic alternate transmission of the uplink reference signal may also be as follows: The number of consecutive subframes in which the uplink reference signal is transmitted on the uplink band is different from the number of consecutive subframes in which the uplink reference signal is transmitted on the downlink band. For example, in subframes 0-2, the uplink reference signal is transmitted on the uplink band; in subframes 3-4, the uplink reference signal is transmitted on the downlink band; in subframes 5-7, the uplink reference signal is transmitted on the uplink band, and so on. In addition, for the non-periodic alternation mode, the number of the preceding consecutive subframes is different or the same and is alternate and non-periodic. For example, in subframes 0-3, the uplink reference signal is transmitted on the uplink band; in subframes 4-5, the uplink reference signal is transmitted on the downlink band; and in subframes 6-7, the uplink reference signal is transmitted on the uplink band.

After the NodeB receives the uplink reference signal that is transmitted by the UE through the uplink band and the downlink band, the NodeB may obtain the CSI of the downlink channel according to the received uplink reference signal on the downlink band, obtain the CSI of the uplink channel according to the uplink reference signal on the uplink band, and select an access point (set) for the UE and schedule time/frequency resources used for transmission according to the obtained CSI.

As seen from the second embodiment, a technical solution of this embodiment of the present invention is as follows: The NodeB sets the signal transmission mode for the UE to transmit the uplink reference signal beforehand, and therefore the UE may transmit the uplink reference signal on the uplink band and the downlink band in the TDM mode according to the obtained signal transmission mode, where the TDM mode includes alternately transmitting the uplink reference signal on the uplink band and the downlink band in a unit of subframe and the alternation mode includes the periodic alternation mode and the non-periodic alternation mode. That is, the NodeB does not need to transmit the downlink reference signal to perform downlink channel measurement but receives the uplink reference signal transmitted by the UE on the downlink band to perform downlink channel measurement, so that the NodeB may obtain downlink CSI. In addition, because the UE does not need to measure the downlink reference signal that is sent by the NodeB and feed back the downlink CSI, signaling overheads of a system caused by uplink feedback are reduced effectively and spectrum efficiency of the system is improved.

The following describes a third embodiment. The third embodiment differs from the second embodiment in that a NodeB further sets a configuration parameter of an uplink reference signal while setting a signal transmission mode.

Figure 4:
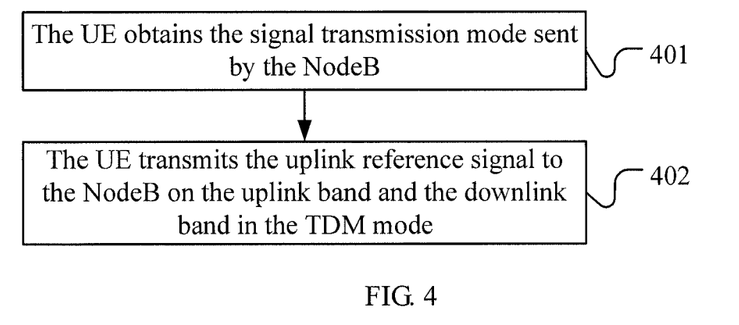
FIG. 4 is a flowchart of a method for transmitting a signal according to a third embodiment of the present invention.

FIG. 4 is a flowchart of a method for transmitting a signal according to a third embodiment of the present invention. The method includes:

Step 401: A UE obtains a signal transmission mode that is sent by a NodeB.

In this embodiment of the present invention, the NodeB needs to set the signal transmission mode of the UE beforehand.

The signal transmission mode set by the NodeB is that the UE simultaneously uses an uplink band and a downlink band to transmit an uplink reference signal. Therefore, the transmission mode of the uplink reference signal is set to a multiplexing mode. The multiplexing mode may be a TDM mode, or other multiplexing modes such as an FDM mode, a code division multiplexing mode, or a space division multiplexing mode. This embodiment takes the TDM mode as an example for description.

The signal transmission mode set by the NodeB may be that the uplink reference signal is alternately transmitted on the uplink band and the downlink band in a unit of subframe, where an alternation mode includes a periodic alternation mode and a non-periodic alternation mode.

The NodeB further sets the configuration parameter of the uplink reference signal in the signal transmission mode.

The NodeB sets the configuration parameter of the uplink reference signal on the uplink band and determines the configuration parameter of the uplink reference signal on the downlink band. The configuration parameter may includes: a transmission period, and/or transmit power, and/or a transmission bandwidth, and/or a hopping mode. It should be noted that parameter configuration of the uplink reference signal on the downlink band may be the same as or different from parameter configuration of the uplink reference signal on the uplink band.

Setting the configuration parameters to be the same or different may adapt to different scenarios and different requirements. For example, for the transmission period, if a requirement is that a channel measurement effect obtained by using the uplink reference signal transmitted on the uplink band and that obtained by using the uplink reference signal transmitted on the downlink band should be equally important, the same period may be configured. If the requirement is that the channel measurement result obtained by using the uplink reference signal transmitted on the downlink band should be more important, the transmission period of the uplink reference signal transmitted on the downlink band may be configured to be shorter (so that channel measurement is more accurate). For the transmit power, if the requirement is that the channel measurement result obtained by using the uplink reference signal transmitted on the downlink band is more important, the transmit power of the uplink reference signal transmitted on the downlink band may be configured to be larger. Another parameter is also set in a similar way.

After setting the configuration parameter, the NodeB sends the signal transmission mode to the UE through downlink control signaling; or the NodeB sends the signal transmission mode to the UE after receiving a request of the UE, so that the UE obtains the signal transmission mode that is set and sent by the NodeB; or the NodeB and the UE agree on the signal transmission mode beforehand without a need of a signaling notification.

Step 402: The UE transmits the uplink reference signal to the NodeB on the uplink band and the downlink band in the TDM mode.

The UE transmits the uplink reference signal according to the signal transmission mode after obtaining the signal transmission mode that is sent by the NodeB.

The UE transmits the uplink reference signal on the downlink band and the uplink band on a time division basis according to the TDM mode. The uplink reference signal is transmitted in a unit of subframe.

According to the signal transmission mode, the UE alternately transmits the uplink reference signal on the uplink band and the downlink band in a unit of subframe, where the alternation mode includes the periodic alternation mode and the non-periodic alternation mode. For details, see the description in the second embodiment.

After the NodeB receives the uplink reference signal transmitted by the UE through the uplink band and the downlink band, the NodeB may obtain CSI of a downlink channel according to the received uplink reference signal on the downlink band, obtain CSI of an uplink channel according to the uplink reference signal on the uplink band, and select an access point (set) for the UE and schedule time/frequency resources used for transmission according to the obtained CSI.

A technical solution of the third embodiment has an effect of the technical solution of the second embodiment. In addition, the technical solution of the third embodiment may further configure the configuration parameter of the uplink reference signal, and therefore the use is more flexible, which may adapt to different scenarios and different requirements.

In the preceding embodiments of the present invention, after receiving the uplink reference signal, the NodeB uses the uplink reference signal transmitted on the downlink band for measuring the downlink channel, and uses the uplink reference signal transmitted on the uplink band for measuring the uplink channel, and may select an access point (set) for the UE and schedule time/frequency resources used for transmission according to a measurement value.

It should also be noted that the preceding technical solutions of the embodiments are described by taking the OFDM system as an example; however, the present invention is not limited thereto, and may also be applied in a Code Division Multiple Access (CDMA) system, a Time Division Multiple Access (TDMA) system, and another mobile communications system.

In addition, the technical solutions of the embodiments of the present invention are described by taking transmission of the uplink reference signal as an example but the present invention is not limited thereto, and a principle of the embodiments of the present invention is also applicable to transmission of the uplink random access signal.

The preceding describes the methods for transmitting a signal in the embodiments of the present invention; accordingly, embodiments of the present invention provide a communications apparatus and a communications system.

Figure 5:
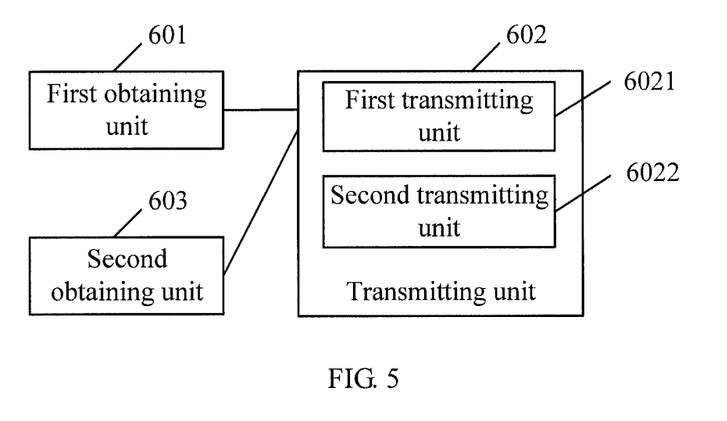
FIG. 5 is a schematic structural diagram of a first communications apparatus according to an embodiment of the present invention.

FIG. 5 is a schematic structural diagram of a first communications apparatus according to an embodiment of the present invention. The communications apparatus may be a UE.

As shown in FIG. 5, the communications apparatus includes a first obtaining unit 601 and a transmitting unit 602.

The first obtaining unit 601 is configured to obtain a signal transmission mode, where the signal transmission mode indicates that an uplink signal is transmitted in a multiplexing mode; and the transmitting unit 602 is configured to transmit the uplink signal on an uplink band and a downlink band of a channel in the multiplexing mode according to the signal transmission mode that is obtained by the first obtaining unit 601.

The uplink signal is the uplink reference signal, and the transmitting unit 602 is further configured to transmit the uplink reference signal on the uplink band and the downlink band in the TDM mode according to the obtained signal transmission mode.

The transmitting unit 602 further includes:
a first transmitting unit 6021, configured to transmit the uplink reference signal on the uplink band and the downlink band in a unit of subframe and in a periodic alternation mode; and/or
a second transmitting unit 6022, configured to transmit the uplink reference signal on the uplink band and the downlink band in a unit of subframe and in a non-periodic alternation mode.

The communications apparatus further includes a second obtaining unit 603.

The second obtaining unit 603 is configured to obtain a configuration parameter, which is further included in the signal transmission mode, of the uplink reference signal.

Specifically, the transmitting unit 602 is configured to transmit the uplink reference signal on the uplink band and the downlink band according to the multiplexing mode that is obtained by the first obtaining unit 601 and the configuration parameter that is obtained by the second obtaining unit 603.

As seen from the embodiment, a technical solution of this embodiment of the present invention is as follows: The UE transmits the uplink reference signal on the uplink band and the downlink band in the multiplexing mode according to the obtained signal transmission mode, which uses both the uplink band and the downlink band, that is, the NodeB does not need to transmit a downlink reference signal to perform downlink channel measurement but receives the uplink reference signal transmitted by the UE on the downlink band to perform downlink channel measurement, so that the NodeB can obtain downlink CSI. In addition, because the UE does not need to measure the downlink reference signal that is sent by the NodeB and feed back the downlink CSI, signaling overheads of a system caused by uplink feedback are reduced effectively and spectrum efficiency of the system is improved.

Figure 6:
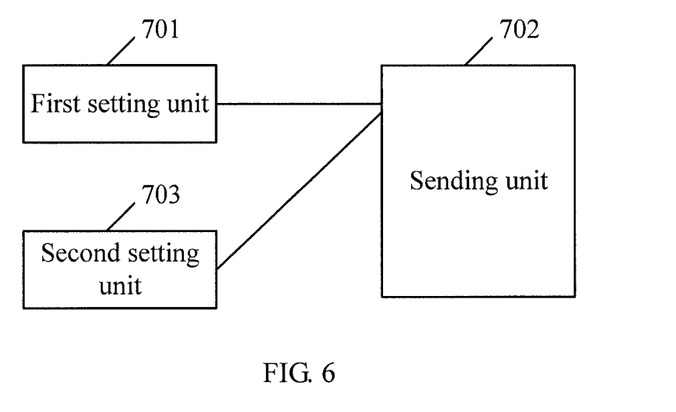
FIG. 6 is a schematic structural diagram of a second communications apparatus according to an embodiment of the present invention.

FIG. 6 is a schematic structural diagram of a second communications apparatus according to an embodiment of the present invention. The communications apparatus may be a NodeB.

As shown in FIG. 6, the communications apparatus includes a first setting unit 701 and a sending unit 702.

The first setting unit 701 is configured to set a signal transmission mode of a UE, where the signal transmission mode indicates that an uplink signal is transmitted in a multiplexing mode; and the sending unit 702 is configured to send the signal transmission mode to the UE and instruct the UE to transmit the uplink signal on an uplink band and a downlink band in the multiplexing mode according to the signal transmission mode.

The multiplexing mode set by the first setting unit 701 is a TDM mode.

The communications apparatus further includes a second setting unit 703.

The second setting unit 703 is configured to: further set a configuration parameter of an uplink reference signal in the signal transmission mode, where the configuration parameter of the uplink reference signal includes the configuration parameters of the uplink reference signals on the uplink band and the downlink band and the configuration parameters of the uplink reference signals on the uplink band and the downlink band are the same or different.

The sending unit 702 is further configured to send the signal transmission mode to the UE and instruct the UE to transmit the uplink reference signal on the uplink band and the downlink band according to the multiplexing mode that is set by the first setting unit 701 and the configuration parameter that is set by the second setting unit 703.

The first setting unit 701 is further configured to set the UE to alternately transmit the uplink reference signal on the uplink band and the downlink band in a unit of subframe, where an alternation mode includes a periodic alternation mode and a non-periodic alternation mode.

As seen from the embodiment, a technical solution of this embodiment of the present invention is as follows: The NodeB sets the signal transmission mode for the UE to transmit the uplink reference signal beforehand, and the UE transmits the uplink reference signal on the uplink band and the downlink band in the multiplexing mode according to the obtained signal transmission mode, which uses both the uplink band and the downlink band, that is, the NodeB does not need to transmit a downlink reference signal to perform downlink channel measurement but receives the uplink reference signal transmitted by the UE on the downlink band to perform downlink channel measurement, so that the NodeB may obtain downlink CSI. In addition, because the UE does not need to measure the downlink reference signal that is sent by the NodeB and feed back the downlink CSI, signaling overheads of a system caused by uplink feedback are reduced effectively and spectrum efficiency of the system is improved.

Figure 7:
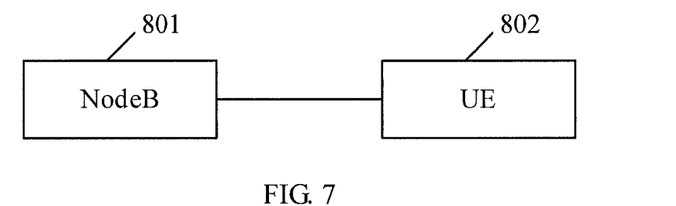
FIG. 7 is a schematic structural diagram of a communications system according to an embodiment of the present invention.

FIG. 7 is a schematic structural diagram of a communications system according to an embodiment of the present invention.

As shown in FIG. 7, the communications system includes a NodeB 801 and a UE 802.

The NodeB 801 is configured to send a signal transmission mode, where the signal transmission mode indicates that an uplink signal is transmitted in a multiplexing mode.

The UE 802 is configured to receive the signal transmission mode and transmit the uplink signal on the uplink band and the downlink band of a channel in the multiplexing mode according to the signal transmission mode.

The uplink signal is the uplink reference signal, and specifically the UE 802 is configured to transmit the uplink reference signal on the uplink band and the downlink band of a channel in a TDM mode.

The UE 802 has the structure shown in FIG. 5, and the NodeB 801 has the structure shown in FIG. 6. For details, see the preceding descriptions.

In conclusion, a technical solution of this embodiment of the present invention is as follows: The UE transmits the uplink reference signal on the uplink band and the downlink band in the multiplexing mode according to the obtained signal transmission mode, which uses both the uplink band and the downlink band, that is, the NodeB does not need to transmit a downlink reference signal to perform downlink channel measurement but receives the uplink reference signal transmitted by the UE on the downlink band to perform downlink channel measurement, so that the NodeB may obtain downlink CSI. Therefore, signaling overheads of the system caused by uplink feedback are reduced effectively and spectrum efficiency of the system is improved.

A person skilled in the art may understand that all or part of the steps of the methods according to the embodiments of the present invention may be implemented by a program instructing relevant hardware. The program may be stored in a computer readable storage medium, such as a read only memory (ROM), a magnetic disk, or a Compact Disk-Read Only Memory (CD-ROM).

The preceding describes a method for transmitting a signal and a communications apparatus provided by the embodiments of the present invention. Although the principle and implementation of the present invention are described with reference to exemplary embodiments, the embodiments are only intended to help understand the method and core idea of the present invention. In addition, with respect to the implementation and applicability of the present invention, modifications and variations may be made by a person skilled in the art according to the idea of the present invention. Therefore, the specification shall not be construed as a limitation on the present invention.

What is claimed is:

1. A method for transmitting a signal, comprising:
obtaining, by a user equipment (UE), a signal transmission mode, wherein the signal transmission mode indicates that an uplink signal is transmitted in a multiplexing mode; and
transmitting, by the UE, the uplink signal on an uplink band and a downlink band in the multiplexing mode according to the obtained signal transmission mode,
wherein:
the uplink signal is an uplink reference signal, and
the transmitting, by the UE, the uplink signal on the uplink band and the downlink band in the multiplexing mode comprises transmitting, by the UE, the uplink reference signal on the uplink band and the downlink band in a time division multiplexing (TDM) mode; and
wherein the transmitting, by the UE, the uplink reference signal on the uplink band and the downlink band in the TDM mode comprises alternately transmitting, by the UE, the uplink reference signal on the uplink band and the downlink band in a unit of subframe.

2. The method for transmitting a signal according to claim 1, wherein:
the signal transmission mode further comprises a configuration parameter of the uplink reference signal; and
the transmitting, by the UE, the uplink signal on the uplink band and the downlink band in the multiplexing mode according to the obtained signal transmission mode comprises:
according to the obtained signal transmission mode, transmitting, by the UE, the uplink reference signal on the uplink band and the downlink band in the multiplexing mode and by referring to the configuration parameter.

3. The method for transmitting a signal according to claim 2, wherein:
the configuration parameter of the uplink reference signal comprises configuration parameters of uplink reference signals on the uplink band and the downlink band and the configuration parameters of the uplink reference signals on the uplink band and the downlink band are same or different.

4. The method for transmitting a signal according to claim 3, wherein:
the configuration parameter of the uplink reference signal comprises one or more of a transmission period, transmit power, a transmission bandwidth, a hopping mode, or any combinations thereof.

5. A communications apparatus as a user equipment (UE), comprising:
non-transitory computer readable storage medium that stores program(s); and
computer hardware configured to implement, including configured by the program(s) to implement:
a first obtaining unit to obtain a signal transmission mode, wherein the signal transmission mode indicates that an uplink signal is transmitted in a multiplexing mode; and a transmitting unit to transmit the uplink signal on an uplink band and a downlink band in the multiplexing mode according to the obtained signal transmission mode, wherein the uplink signal is an uplink reference signal, and the multiplexing mode is a time division multiplexing (TDM) mode; and wherein the transmitting unit further comprises:
   a first transmitting unit to transmit the uplink reference signal on the uplink band and the downlink band in a unit of subframe and in a periodic alternation mode, and/or
   a second transmitting unit to transmit the uplink reference signal on the uplink band and the downlink band in a unit of subframe and in a non-periodic alternation mode.

6. The communications apparatus according to claim 5, further comprising:
   a second obtaining unit to obtain a configuration parameter, which is further comprised in the signal transmission mode, of the uplink reference signal;
   wherein the transmitting unit is further configured to transmit the uplink reference signal on the uplink band and the downlink band according to the multiplexing mode that is obtained by the first obtaining unit and the configuration parameter that is obtained by the second obtaining unit.

7. A communications apparatus, comprising:
   non-transitory computer readable storage medium that stores program(s); and
   computer hardware configured to implement, including configured by the program(s) to implement:
      a first setting unit to set a signal transmission mode of a user equipment (UE), wherein the signal transmission mode indicates that an uplink signal is transmitted in a multiplexing mode; and
      a sending unit to send the signal transmission mode to the UE and instruct the UE to transmit the uplink signal on an uplink band and a downlink band in the multiplexing mode according to the signal transmission mode,
   wherein the uplink signal is an uplink reference signal and the first setting unit sets the UE to alternately transmit the uplink reference signal on the uplink band and the downlink band in a unit of subframe.

8. The communications apparatus according to claim 7, further comprising:
   a second setting unit to further set a configuration parameter of the uplink reference signal in the signal transmission mode, wherein:
   the configuration parameter of the uplink reference signal comprises configuration parameters of uplink reference signals on the uplink band and the downlink band and the configuration parameters of the uplink reference signals on the uplink band and the downlink band are same or different; and
   the sending unit sends the signal transmission mode to the UE and instruct the UE to transmit the uplink reference signal on the uplink band and the downlink band according to the multiplexing mode that is set by the first setting unit and the set configuration parameter.

* * * * *